United States Patent
Perdomi et al.

(10) Patent No.: US 6,689,436 B2
(45) Date of Patent: *Feb. 10, 2004

(54) LLDPE-BASED THERMOSHRINKABLE FILMS

(75) Inventors: Gianni Perdomi, Ferrara (IT); Claudio Cometto, Bologna (IT); Enrico Beccarini, Ferrara (IT)

(73) Assignee: Basell Technology Company bv, Hoofddorp (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/634,406

(22) Filed: Apr. 18, 1996

(65) Prior Publication Data

US 2002/0061975 A1 May 23, 2002

(30) Foreign Application Priority Data

Dec. 18, 1995 (IT) ............................ MI95A2654

(51) Int. Cl.$^7$ .................. C08L 23/16; C08L 23/14; C08J 5/18
(52) U.S. Cl. .................. 428/34.9; 428/35.1; 428/910; 428/516; 525/240
(58) Field of Search .................. 525/240, 322; 428/516, 34.9, 35.1, 910

(56) References Cited

U.S. PATENT DOCUMENTS

| | | | |
|---|---|---|---|
| 4,218,339 A | | 8/1980 | Zucchini et al. |
| 4,472,520 A | | 9/1984 | Zucchini et al. |
| 4,532,189 A | | 7/1985 | Mueller |
| 4,597,920 A | | 7/1986 | Golike |
| 4,665,130 A | * | 5/1987 | Hwo |
| 4,670,529 A | * | 6/1987 | Kitamura et al. |
| 4,748,221 A | | 5/1988 | Collomb et al. |
| 4,761,462 A | * | 8/1988 | Kitamura et al. |
| 4,803,251 A | | 2/1989 | Goode et al. |
| 5,051,481 A | * | 9/1991 | Taka et al. |
| 5,206,075 A | * | 4/1993 | Hodgson, Jr. ............... 526/943 |
| 5,241,030 A | * | 8/1993 | Barry et al. |
| 5,387,749 A | * | 2/1995 | Govoni et al. |
| 5,560,997 A | * | 10/1996 | Kotani et al. ............... 428/910 |
| 5,614,315 A | * | 3/1997 | Kondo et al. ............... 428/332 |
| 5,674,945 A | * | 10/1997 | Takahashi et al. .......... 525/240 |

FOREIGN PATENT DOCUMENTS

| | | |
|---|---|---|
| EP | 0 395 083 A2 | 10/1990 |
| EP | 0 434322 A1 | 6/1991 |
| EP | 0 553 805 A1 | 8/1993 |
| EP | 0 553 806 A1 | 8/1993 |
| EP | 0 586 160 A1 | 3/1994 |
| EP | 0 595 252 A1 | 5/1994 |
| GB | 2007685 * | 5/1979 |
| GB | 2063278 * | 6/1981 |
| WO | WO 93/03078 | 2/1993 |
| WO | WO 94/21726 | 9/1994 |
| WO | WO 95/20009 | 7/1995 |

OTHER PUBLICATIONS

Kaminsky et al., Makromol. Chem., Macromol. Symp. vol. 4, pp. 103–118 (1986).*

Alger, "Polymer Science Dictionary", $2^{nd}$ ed., Chapman & Hall, New York, p. 42 (1997).*

* cited by examiner

Primary Examiner—D. R. Wilson
(74) Attorney, Agent, or Firm—Bryan Cave LLP

(57) ABSTRACT

"HEAT-SHRINKABLE FILMS BASED ON POLYOLEFIN COMPOSITIONS COMPRISING: (I) A LINEAR COPOLYMER OF ETHYLENE WITH ONE OR MORE α-OLEFINS (LLDPE); (II) A COPOLYMER OF PROPYLENE HAVING A PARTICULAR COMPOSITION AND CHARACTERISTICS. THE FILMS ARE CHARACTERIZED BY GOOD OPTICAL AND MECHANICAL PROPERTIES, IN PARTICULAR A HIGH TEAR RESISTANCE."

7 Claims, No Drawings

LLDPE-BASED THERMOSHRINKABLE FILMS

This invention relates to heat-shrinkable films based on polyolefin compositions comprising linear copolymers of ethylene with α-olefins having from 3 to 12 carbon atoms (LLDPE) and particular propylene copolymers, the said polyolefin compositions having particular mechanical properties.

The use of LLDPE in the production of single- or multi-layer heat-shrinkable films is widely known in the art. The said films are usually produced by extrusion of the polymer, obtaining a primary film which is then oriented by stretching under temperature conditions such that there is molecular orientation without there being any problems of tearing and breakage. The polymer used in the production of the film must therefore be plastic enough to be stretched, within the temperature range in which the orientation process takes place, and at the same time strong enough to withstand the stretching force. In addition, the temperature range within which these two properties co-exist must be as wide as possible, as narrow temperature ranges would make it difficult to manage the stretching and orientation process. The orientation can either be in a single direction or in two directions, usually perpendicular to each other (biaxial orientation). Biaxial orientation is generally carried out using, for example, the twin-bubble or tenter frame method. Once it has been oriented, the film has the ability—when subjected to a certain temperature—to shrink or to exert a shrinkage force when actual shrinkage is prevented, thus adhering perfectly to the object to be packaged.

In the case of single-layer films based on LLDPE, or in multi-layer films in which the various layers are made up essentially of LLDPE, it is usually necessary to cross-link the film, at least partially, before subjecting it to the orientation process, so as to give it adequate mechanical properties to withstand the stretching force. The cross-linking is usually effected by irradiating the film. As an alternative or in addition to cross-linking, LLDPE is blended with other polymers, such as ethylene/vinyl acetate (EVA) or VLDPE/ULDPE copolymers, to obtain films which have adequate mechanical properties and are easy to work. These techniques affect the economics of the production process and thus the final cost of the film.

Non-cross-linked films based exclusively on LLDPE can only be produced when LLDPE is a copolymer of ethylene with a higher α-olefin, for example 1-octene. With other olefins, for example 1-butene or 1-hexene, the temperature needed for orientation is so close to the melting point of the polymer that in practice it is not possible to stretch the film, even at low speed, without there being breakages in the film itself. U.S. Pat. No. 4,597,920 describes a process for the production of heat-shrinkable films in which the polymer used is a copolymer of ethylene with an α-olefin having 8–18 carbon atoms. The copolymer is characterized by two different melting points which allow the production of films on a commercial basis without cross-linking the polymer. The working range, however, is restricted; it can be seen in fact from the examples that the film can only be stretched with good results at temperatures between 115 and 120° C. In addition, LLDPEs modified with 1-octene or higher α-olefins have significantly higher costs than conventional LLDPEs modified with 1-butene.

Patent application EP-A-434322 describes the use of blends of ethylene/1-hexene copolymers or ethylene/1-octene copolymers with significant quantities of LDPE. According to the description in the patent, the addition of LDPE to LLDPE modified with 1-hexene (which cannot be used as such in the production of heat-shrinkable films) makes it possible to use the mixture which is obtained in the production of heat-shrinkable films; the mixture of LDPE with LLDPE modified with 1-octene is claimed, however, to increase the extrusion rate and thus the productivity of the process. The working range remains very restricted, however.

Patent application WO 94/21726 describes single-layer bioriented heat-shrinkable films obtained from polymer compositions comprising an ethylene/α-olefin copolymer, a polymeric alloy (made up of a heterophasic composition in which an amorphous ethylene/propylene copolymer is dispersed in a homopolymeric propylene matrix) and/or a random copolymer of propylene with ethylene, and possibly a crystallization inhibitor. According to what is reported in the said patent application, the compositions described allow good management of the blowing and orientation phase in twin-bubble processes. The preferred ethylene/a-olefin copolymer is an LLDPE modified with 1-octene; no examples are reported in which LLDPE is modified with 1-butene or 1-hexene.

It has now been found that by using particular polymer compositions based on LLDPE it is possible to produce heat-shrinkable films having very good mechanical properties (in some cases superior to those of cross-linked films) without using cross-linking treatments and without encountering any problems during the orientation process. Surprisingly, it has in fact been seen that polyolefin compositions comprising LLDPE and particular propylene copolymers can be used in the orientation processes without problems of tearing or breakages even when LLDPE is made up of an ethylene/1-butene copolymer.

The films of this invention are also characterized by a good set of optical and mechanical properties, in particular high tear resistance, which makes them particularly suited to use on high-speed packaging lines.

The heat-shrinkable films of this invention comprise a polyolefin composition containing: (i) from 80 to 100 parts by weight of a copolymer of ethylene (LLDPE) with one or more $CH_2=CHR$ α-olefins, where R is a hydrocarbon radical having 1–10 carbon atoms, the said copolymer containing up to 20 mol % of $CH_2=CHR$ α-olefin and having a density between 0.88 and 0.945 g/cm$^3$; and (ii) from 5 to 30 parts by weight of a copolymer of propylene with one or more $CH_2=CHR^1$ α-olefins, where $R^1$ is a hydrocarbon radical having from 2 to 10 carbon atoms, and possibly with ethylene, the said copolymer containing from 60 to 98% by weight of units derived from propylene, from 2 to 40% by weight of units derived from the $CH_2=CHR^1$ α-olefin, and from 0 to 10% by weight of units derived from ethylene, and having a xylene-insoluble fraction greater than 70%.

Copolymer (i) is preferably present in amounts between 90 and 100 parts by weight and has a density preferably between 0.89 and 0.94 g/cm$^3$. More preferably these values are between 0.90 and 0.935.

The Melt Index (determined by the ASTM D-1238 method, condition E) of copolymer (i) has values which are usually between 0.1 and 10 g/10 minutes, preferably between 0.2 and 5 g/10 minutes, more preferably between 0.2 and 3 g/10 minutes.

The $CH_2=CHR$ α-olefin can for example be chosen from propylene, 1-butene, 1-hexene, 1-octene and 4-methyl-1-pentene; 1-butene or 1-hexene is preferably used. In the production of component (i) the $CH_2=CHR$ α-olefins can also be used mixed.

Copolymer (i) is produced by copolymerization of ethylene with a $CH_2=CHR$ α-olefin, in the presence of a catalyst of the Ziegler-Natta type obtained from the reaction of an organometallic compound of a metal in Groups II and III of the Periodic System with a catalytic component comprising a compound of a transition metal belonging to Groups IV, V or VI of the Periodic System. The transition metal compound is preferably supported on a solid support comprising a magnesium halide in an active form. Examples of catalysts that can be used in the production of copolymer (a) are described in U.S. Pat. No. 4,218,339 and U.S. Pat. No. 4,472,520, the description from which is included here for reference purposes. The catalysts can also be produced by the methods described in the patents U.S. Pat. Nos. 4,748,221 and 4,803,251.

Other examples of catalysts are described in the patent applications EP-A-395083, EP-A-553805 and EP-A-553806.

Copolymer (ii) is preferably present in amounts between 10 and 25 parts by weight.

Copolymer (ii) can for example be a propylene/$CH_2=CHR^1$ α-olefin copolymer, containing from 70 to 95% by weight of units derived from propylene and from 5 to 30% by weight of units derived from the $CH_2=CHR^1$ α-olefin. The said copolymer is preferably a terpolymer of propylene with ethylene and a $CH_2=CHR^1$ α-olefin. In this case its content of units derived from propylene is between 80 and 98% by weight, preferably between 85 and 96% by weight, the content of units derived from ethylene is between 1 and 10% by weight, preferably between 2 and 7% by weight, and the content of units derived from the $CH_2=CHR^1$ α-olefin is between 1 and 10% by weight, preferably between 2 and 8% by weight. The content of the various components is determined by IR and NMR analysis.

The $CH_2=CHR^1$ α-olefin can for example be chosen from 1-butene, 1-hexene, 1-octene and 4-methyl-1-pentene, and is preferably 1-butene or 1-hexene.

The xylene-insoluble fraction, determined by the method described later, is preferably greater than 80%, more preferably greater than 85%. The enthalpy of melting of copolymer (ii) is generally higher than 50 J/g, preferably higher than 60 J/g, more preferably higher than 70 J/g. The melting temperature of copolymer (ii) is less than 140° C. and preferably between 120 and 140° C.

The crystallinity index of copolymer (ii) is generally higher than 50%.

The Melt Index (determined by the ASTM D-1238 method, condition L) of copolymer (ii) has values which are generally between 1 and 1000, preferably between 2 and 100, more preferably between 2 and 30.

The copolymers (ii) can be conveniently produced using a highly stereospecific catalyst, for example of the type described in patent application EP-A-395083, the description from which is included here for reference purposes.

The polyolefin compositions containing components (i) and (ii) can be produced by mixing the components in the molten state, for example in a mixer having a high homogenizing power.

The said polyolefin composition is preferably produced by a sequential polymerization process consisting of at least two stages, where, in any order, ethylene and one or more $CH_2=CHR$ α-olefins are polymerized in one stage, obtaining a copolymer (i) containing up to 20 mol % of $CH_2=CHR$ α-olefin and having a density between 0.88 and 0.945 g/cm$^3$, and propylene, one or more $CH_2=CHR^1$ α-olefins and possible ethylene are polymerized in another stage, obtaining a copolymer (ii) containing from 60 to 98% by weight of units derived from propylene, from 2 to 40% by weight of units derived from the $CH_2=CHR^1$ α-olefin and from 0 to 10% by weight of units derived from ethylene, and having a xylene-insoluble fraction greater than 70%. The polymerization is conveniently carried out in a gas phase, using fluidized-bed reactors. Examples of processes of this type and of products made by this method are described in the international patent applications WO 93/03078 and WO 95/20009, the description from which is included here for reference purposes. WO 95/20009 uses a solid catalytic component comprising a titanium compound containing at least a titanium-halogen bond supported on a magnesium halide is active form.

The heat-shrinkable films of the invention can be conveniently produced using methods known in the art, such as the tenter frame or twin-bubble method. In the latter case, the method involves the production of a primary tubular film by extrusion of the polymer components through an annular slot. The primary film is calibrated and rapidly cooled and then heated (by IR or hot air) and oriented in the longitudinal and transverse directions by blowing with compressed air (transverse orientation) and increasing the speed of the take-up roll (longitudinal orientation). The bioriented film is then rapidly cooled to stabilize the molecular orientation of the film. By this method it is possible to produce both single-layer and multi-layer films in which the various layers can have the same composition or different compositions.

A particular embodiment of the invention relates to single-layer heat-shrinkable films comprising polyolefin compositions containing components (i) and (ii) as previously described. It has in fact been seen that by using the said polyolefin compositions (particularly when these are produced directly by synthesis using a sequential polymerization process) it is possible to produce films having good optical and mechanical properties, without cross-linking the film, even when copolymer (i) is a copolymer of ethylene with 1-butene; this result is certainly surprising as it is known that until now copolymers of this type have not been used as essential components of non-cross-linked heat-shrinkable films, in view of the well-known processability problems.

Another embodiment of this invention relates to multi-layer heat-shrinkable films in which at least one layer comprises polyolefin compositions containing components (i) and (ii) as previously described. For example, it is possible to produce 3-layer films, with a structure AAA, in which all the layers are obtained from compositions containing components (i) and (ii), or else with a structure BAB, in which the middle layer is obtained from compositions containing components (i) and (ii) and the outer layers are obtained from other olefin polymers, as reported in the patents US 4532189, EP-A-586160 and EP-A-595252.

The films of this invention, both single- and multi-layer, are characterized by a good set of physicomechanical properties, in particular optimum tear resistance, and by improved processability compared with films of the prior art having a similar structure. The film can in fact be easily oriented, without problems due to bubble instability, in a temperature range which is wider than the conventionally used temperatures, thus allowing the working window to be widened.

The weight ranges described relate to the weight ratios of components (i) and (ii). As is known to experts in the field, and as can be easily determined by routine tests, it is obviously possible to add further polymer components (f.i. EVA, LDPE, HDPE, etc.), additives (such as adhesion enhancers, stabilizers, antioxidants, anticorrosives, processing aids, etc.) and both organic and inorganic substances which can give specific properties to the films of the invention.

The films of this invention have broad applications in the packaging sector, particularly the packaging of small objects, foods, etc.

The following examples are given as illustrations and do not restrict the invention.

EXAMPLES

The properties indicated were determined by the following methods:

Composition of polymers: percentage by weight of the various monomers determined by I.R.;

Xylene-insoluble fraction: 2 g of polymer are dissolved in 250 cm$^3$ of xylene at 135° C., with stirring. After 20 minutes the solution is left to cool, while still stirring, until the temperature reaches 25° C. After 30 minutes the precipitated insoluble polymer is separated by filtration. The solvent is removed from the solution by evaporation in a stream of nitrogen and the residue is dried under vacuum at 80° C. to constant weight. In this way the percentage of polymer soluble in xylene at 25° C. is calculated and the percentage of polymer that is insoluble is thus determined;

Enthalpy of melting: ASTM D 3418-82;

Density: ASTM D 1505;

Melt Index E (MIE): ASTM D 1238, condition E;

Melt Index F (MIF): ASTM D 1238, condition F;

Melt Index L (MIL): ASTM D 1238, condition L;

F/E: ratio between Melt Index F and Melt Index E;

Tear resistance: ASTM D 1004

Breaking elongation: ASTM D 882

Breaking load: ASTM D 882

Dart test: ASTM D 1709/A

Haze: ASTM D 1003

Production of the Film: General Procedure

The films were produced by the twin-bubble method with the following steps:

- extrusion of the polymer composition in a single-screw extruder with head temperatures of about 190–195° C.;
- cooling of the primary tubular film to temperatures around 25° C.;
- heating of the primary film in an oven with IR rays;
- biorientation with a 6/6 longitudinal/transverse stretch ratio;
- cooling of the bioriented tubular film to room temperature.

Example 1

A single-layer film was produced using a (i)+(ii) polyolefin composition obtained directly in the polymerization process, operating in two gas-phase reactors as described in the international patent application WO 95/20009. The composition comprised 85% of an ethylene/1-butene copolymer [component (i)] and 15% of a terpolymer of propylene (92.1%) with ethylene (2.3%) and 1-butene (5.6%) having a xylene-insoluble fraction greater than 70% [component (ii)]. The resultant composition had an MIE of 0.57 and a density of 0.9073.

Operating as described in the general methodology for production of the film, a film 15 µm thick was obtained, the characteristics of which are shown in Table 1.

Example 2

A single-layer film was produced using a (i)+(ii) polyolefin composition obtained directly in the polymerization process, operating in two gas-phase reactors as described in the international patent application WO 95/20009. The composition comprised 85% of an ethylene/1-butene copolymer [component (i)] and 15% of a terpolymer of propylene (92.1%) with ethylene (2.3%) and 1-butene (5.6%) having a xylene-insoluble fraction greater than 70% and an MIL of 13.2 [component (ii)]. The resultant composition had an MIE of 1.06 and a density of 0.910.

Operating as described in the general methodology for production of the film, a film 15 µm thick was obtained, the characteristics of which are shown in Table 1.

Example 3 (comparison)

For comparison purposes, a commercial film 15 µm thick (GRACE MR) was characterized and compared with the films of this invention. The results are shown in Table 1.

TABLE 1

|  | EX. 1 | EX. 2 | comp. |
|---|---|---|---|
| Tear Resistance MD (N) | 2.7 | 1.9 | 1.6 |
| Tear Resistance TD (N) | 2.6 | 1.9 | 1.6 |
| Breaking elongation MD (%) | 96 | 88 | 59 |
| Breaking load MD (MPa) | 89.7 | 86.1 | 93.1 |
| Breaking elongation TD (%) | 89 | 81 | 79 |
| Breaking load TD (MPa) | 89.7 | 82 | 85.8 |
| Dart Test (g/µm) | 16 | 20.7 | 34.3 |
| Haze (%) | 3.2 | 3.6 | 2.8 |

What is claimed is:

1. A heat-shrinkable film prepared by stretching an unoriented primary film by a factor of 6 in two directions perpendicular to each other to reach a final thickness of 15 micrometers, said film being made from a non-crosslinked polyolefin composition consisting essentially of:

(i) 85% by weight of a copolymer of ethylene with one or more α-olefins selected from the group consisting of 1-butene, 1-hexene and mixtures thereof, and (ii) 15% by weight of a copolymer of propylene with ethylene and one or more α-olefin selected from 1-butene, 1-hexene, and mixtures thereof, wherein said copolymer (i): contains up to 20% by mole of α-olefin, is prepared in the presence of a Ziegler-Natta catalyst obtained from an organometallic compound of a metal in Groups II and III of the Periodic System with a solid catalytic component comprising a titanium compound containing at least a titanium-halogen bond and supported on a magnesium halide in active form, and has a density between 0.88 and 0.945 g/cm; and wherein said copolymer (ii) contains from 80 to 98% by weight of units derived from propylene, from 1 to 10% by weight of units derived from ethylene, from 1 to 10% by weight of units derived from α-olefins, and has a xylene-insoluble fraction, at 25° C., greater than 70%.

2. Heat-shrinkable film according to claim 1, in which copolymer (ii) has a xylene-insoluble fraction, at 25° C., greater than 80%.

3. The heat-shrinkable film of claim 1, wherein the film is a single layer film.

4. The film of claim 1, wherein the co-monomer of copolymer (i) is 1-butene.

5. The film of claim 1, wherein the co-monomer of copolymer (i) is 1-hexene.

6. The film of claim 1, wherein the co-monomer of copolymer (ii) is 1-butene.

7. The film of claim 1, wherein the co-monomer of copolymer (ii) is 1-hexene.

* * * * *